Patented Aug. 31, 1948

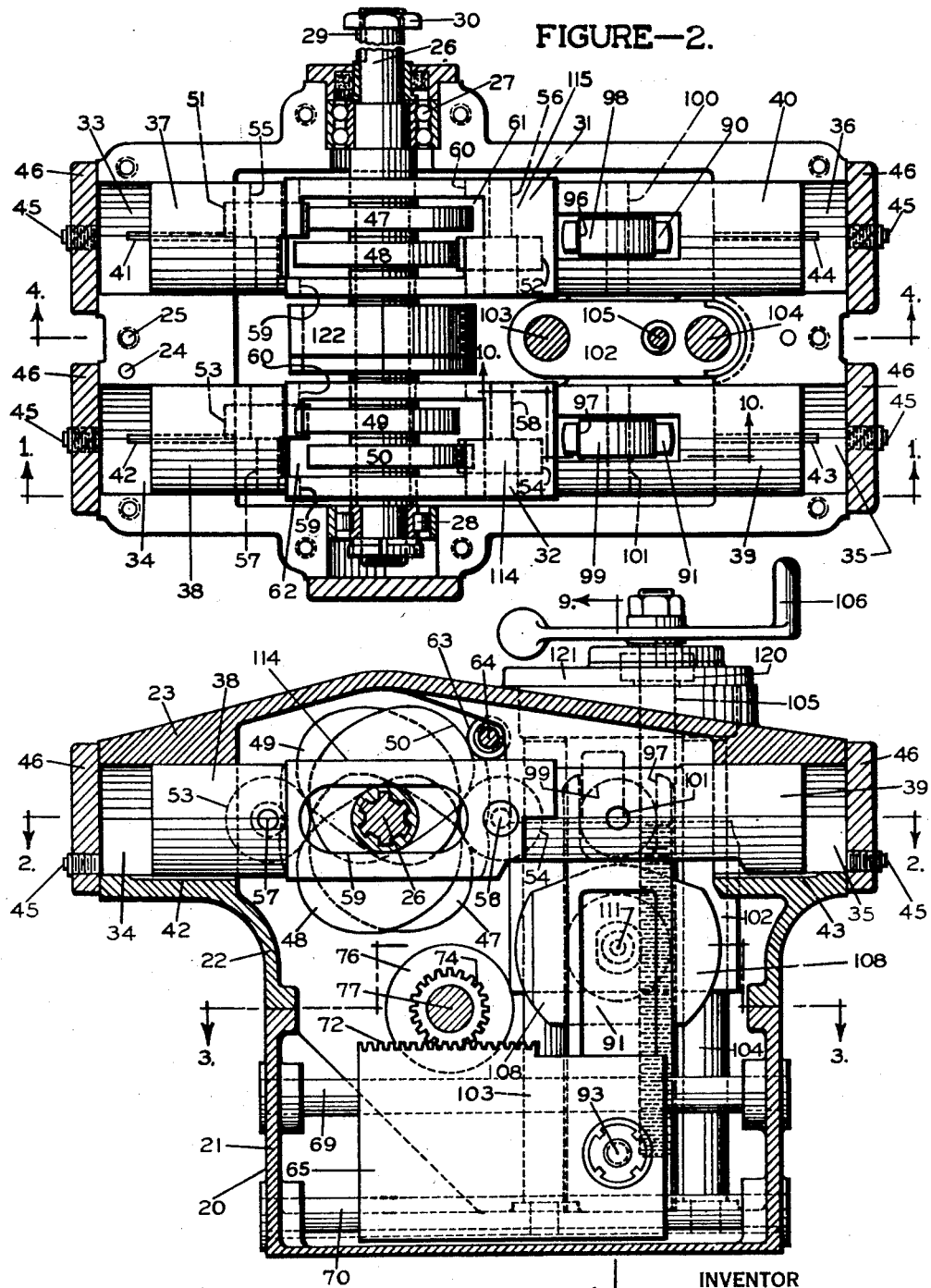
Aug. 31, 1948.　　　G. T. MOO　　　2,448,386
MECHANICAL TRANSMISSION
Filed Oct. 29, 1943　　　6 Sheets-Sheet 1
FIGURE—2.
FIGURE—1.
INVENTOR
Gothard T. Moo
BY
Albert M. Austin
ATTORNEY Aug. 31, 1948.    G. T. MOO    2,448,386
MECHANICAL TRANSMISSION
Filed Oct. 29, 1943    6 Sheets-Sheet 2
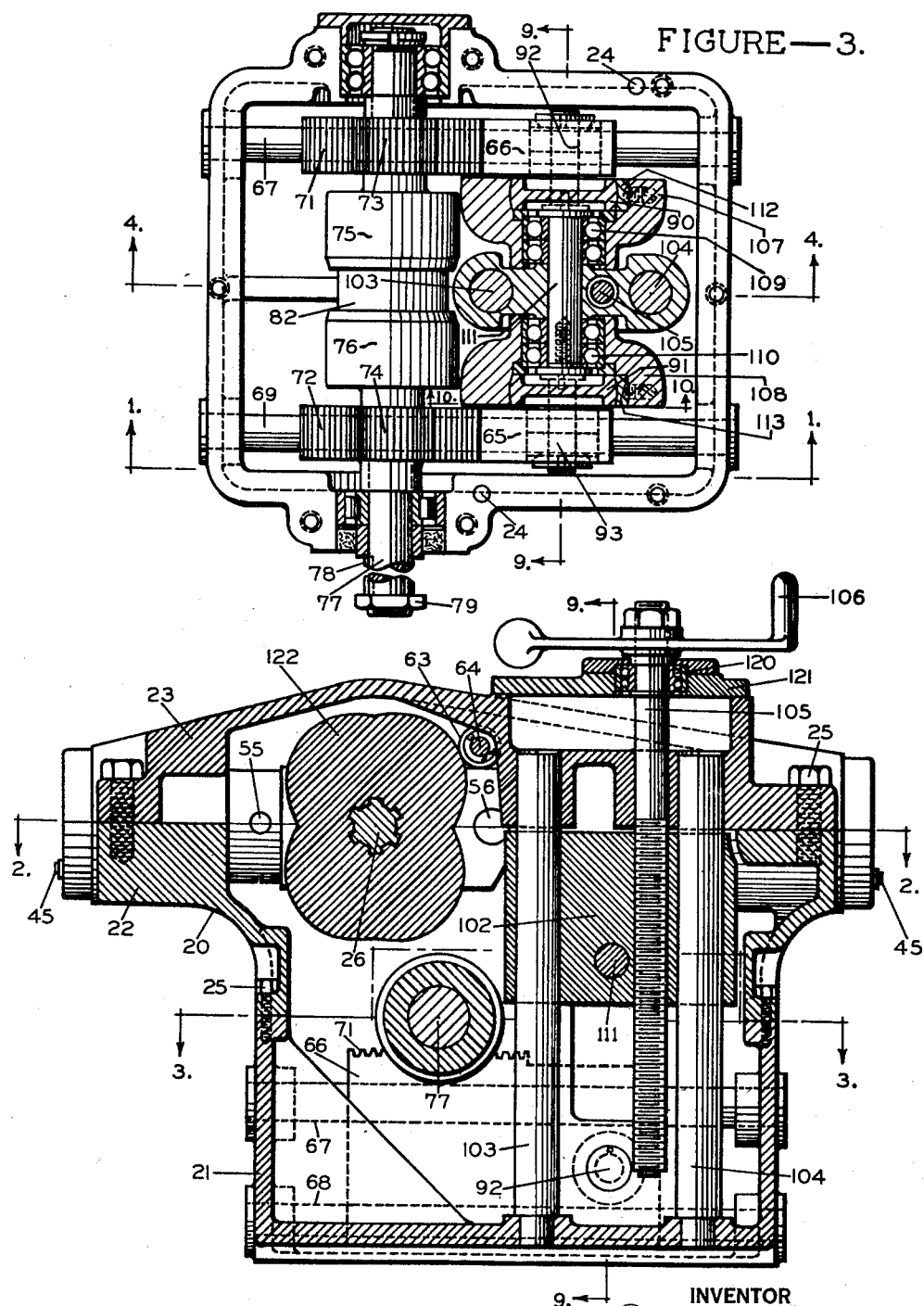
FIGURE—3.
FIGURE—4.
INVENTOR
Gothard T. Moo
BY
Albert M. Austin
ATTORNEY Aug. 31, 1948.  G. T. MOO  2,448,386
MECHANICAL TRANSMISSION
Filed Oct. 29, 1943  6 Sheets-Sheet 3
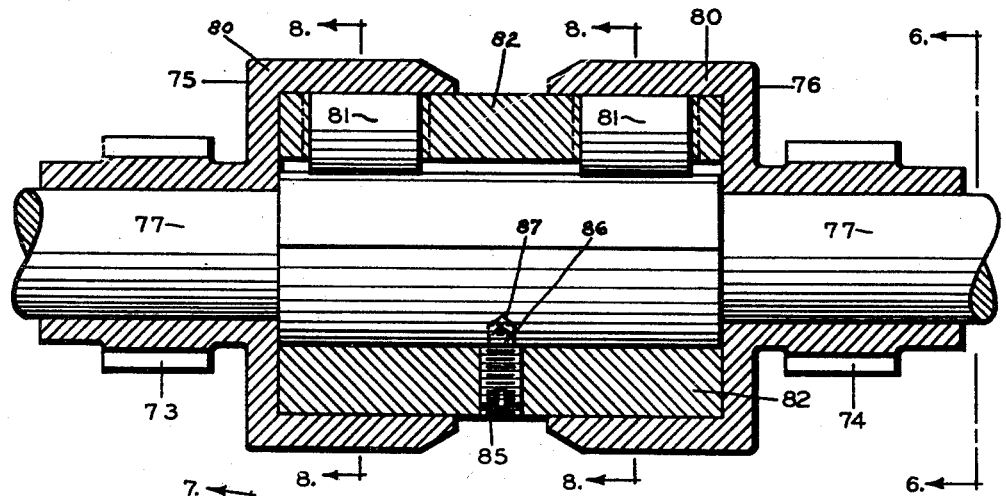
FIGURE—7.
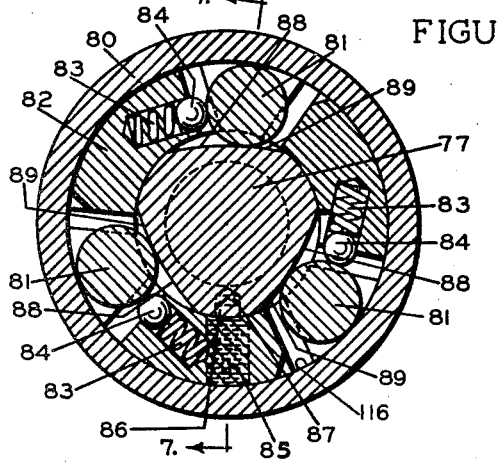
FIGURE—8.
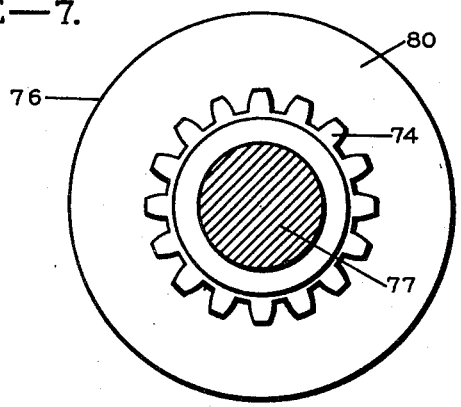
FIGURE—6.
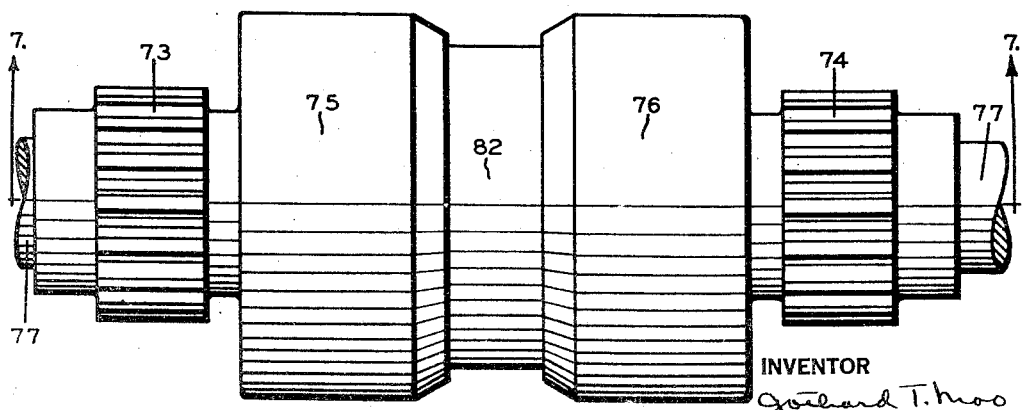
FIGURE—5.
INVENTOR
Garland T. Moo
BY
Albert M. Austin
ATTORNEY

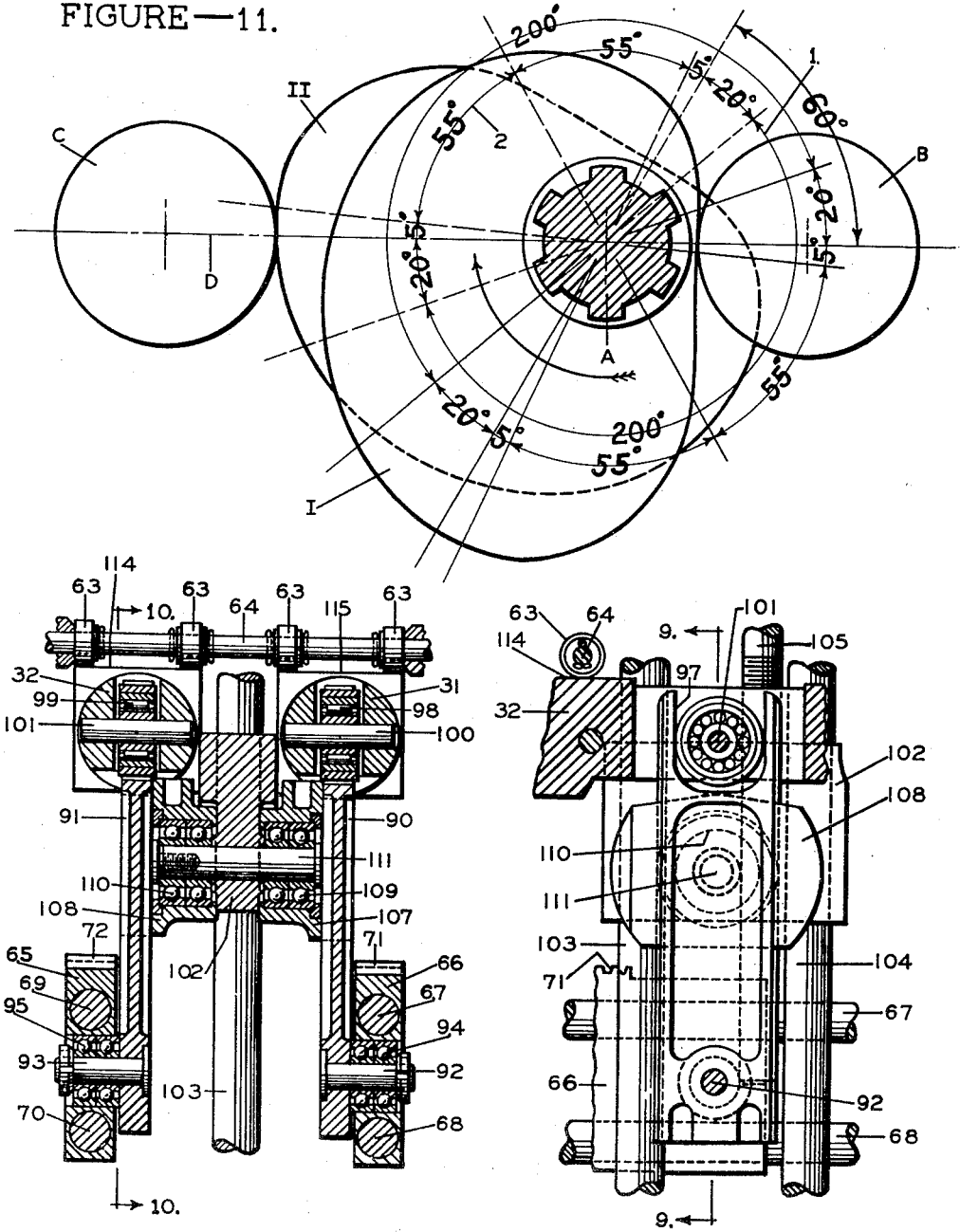

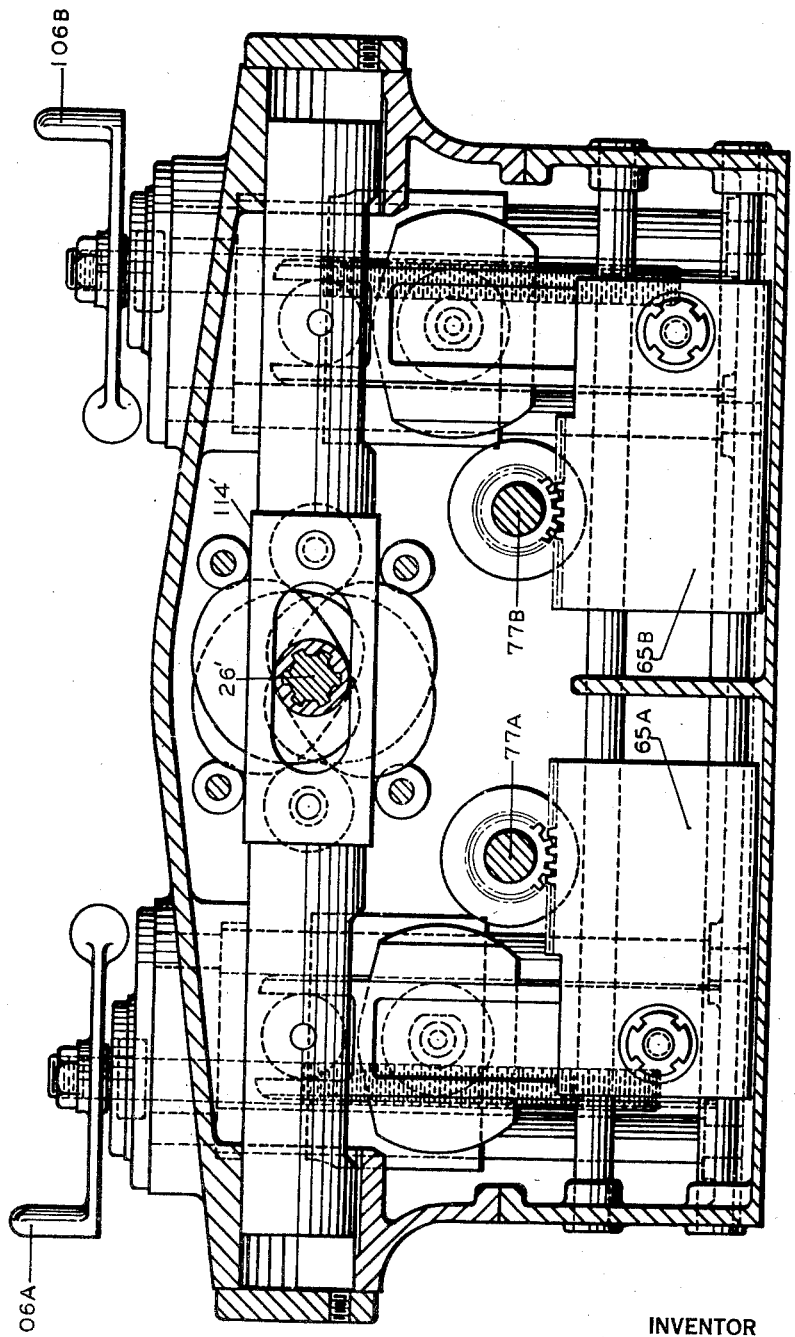

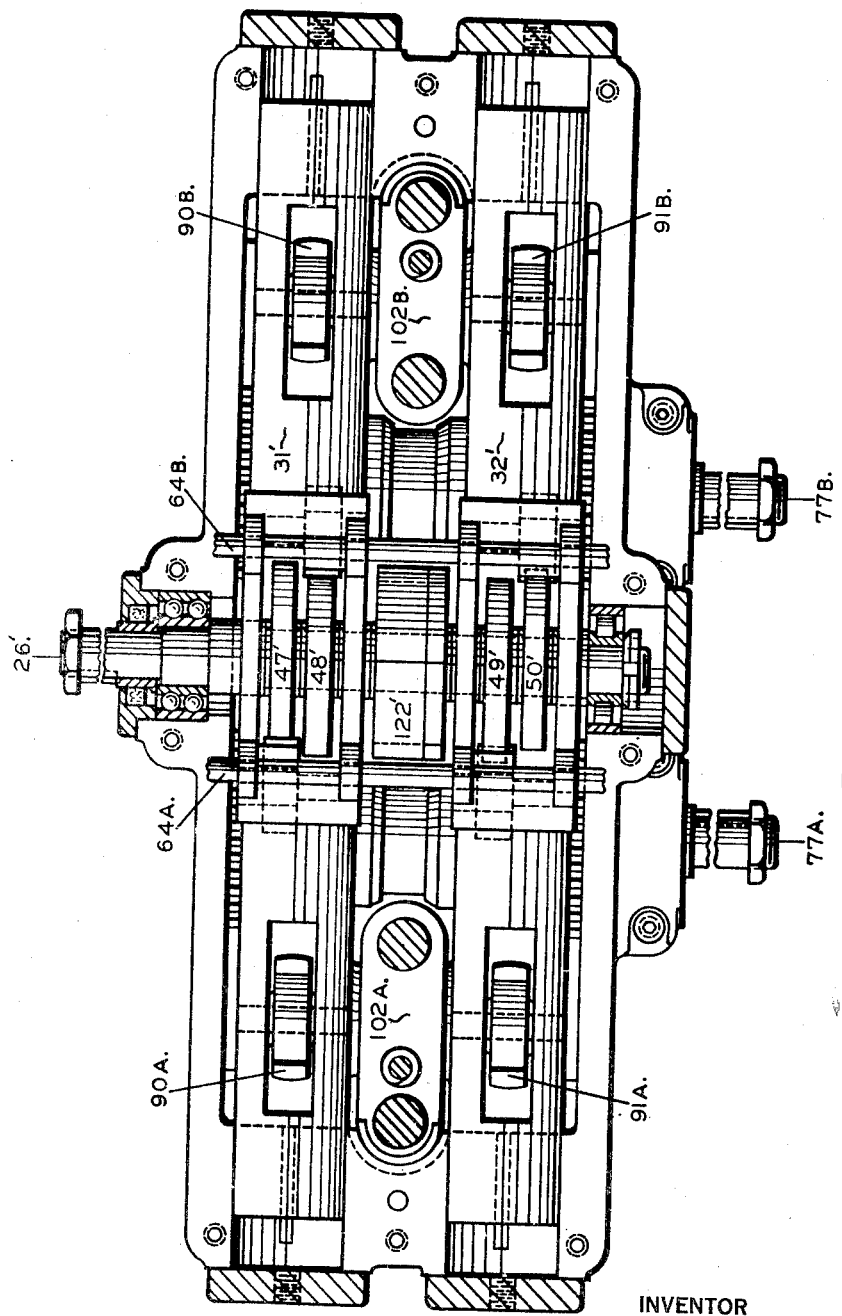

2,448,386

UNITED STATES PATENT OFFICE 2,448,386

MECHANICAL TRANSMISSION

Gothard Theodore Moo, Cranston, R. I., assignor to Weskenson Corporation, Providence, R. I., a corporation of Rhode Island Application October 29, 1943, Serial No. 508,203

7 Claims. (Cl. 74—124)

The invention relates to transmissions having infinitely variable speed ratios and more particularly to transmissions of the type disclosed in Johnson Patent No. 2,316,793, dated April 20, 1943.

According to a preferred form of the present invention, the transmission comprises an input shaft having two sets of cams, one cam of each set being a power cam and the other cam of each set being a return cam. The two sets of cams drive two plunger members respectively. Each plunger member has two roll followers engaging their respective cams. The two plunger members drive two working beams, respectively, and the two working beams drive two slide members, respectively. Each slide member has a rack engaging a pinion. The two pinions drive the output shaft through individual roller-drives. The speed ratio between the input and output shafts is controlled by a crosshead movable along a guideway perpendicular to the lines of movement of the plunger and slide members. The same crosshead fulcrums the two working beams, one on each side, each working beam having a sliding pivotal connection with its corresponding plunger member and a fixed pivotal connection with its corresponding slide member. If desired, bracing or stabilizing rollers may be provided to offset any tendency of the plungers to rotate on their own axes. Furthermore, special pneumatic dashpots may be provided between the ends of the plunger members and the cylinders in which they work to help cushion the reciprocating plungers at the ends of their strokes.

In some cases it is desirable to drive a plurality of independently controlled output shafts from the same input shaft. In such a case a single pair of plungers is provided but a plurality of pairs of slides, a plurality of pairs of working beams, and a plurality of crossheads are provided, corresponding to the number of output shafts, all driven from the single pair of plungers.

The invention includes certain novel and original features of construction and combination of parts hereinafter set forth and claimed.

The objects and features of the invention will appear from a consideration of the description which follows accompanied by drawings showing for pure illustrative purposes a preferred embodiment of the invention. It is to be understood, however, that the description and the drawings are not to be taken in a limiting sense, the scope of the invention being defined in the appended claims.

In the drawings:

Fig. 1 is a sectional elevation of a preferred form of transmission embodying the invention, taken on the line 1—1 of Fig. 2;

Fig. 2 is a sectional plan view, taken on line 2—2 of Fig. 1;

Fig. 3 is a sectional plan view, taken on line 3—3 of Fig. 1;

Fig. 4 is a sectional elevation, taken on line 4—4 of Fig. 2;

Fig. 5 is a side elevation of a set of roller-drives and their pinions;

Fig. 6 is a front elevation of the elements shown in Fig. 5;

Fig. 7 is a sectional side view of the elements shown in Fig. 5;

Fig. 8 is a section taken on line 8—8 of Fig. 7;

Fig. 9 is a section taken on the line 9—9 of Fig. 1 illustrating the movable parts, the casing being omitted for clearness of illustration;

Fig. 10 is a section taken on the line 10—10 of Fig. 9;

Fig. 11 is a diagram showing a preferred form of cam drive;

Fig. 12 is a sectional elevation, corresponding to Fig. 1, of a modification in which a plurality of separately adjustable output shafts are driven by the input shaft; and Fig. 13 is a sectional plan view corresponding to Fig. 2 of the modification illustrated in Fig. 12.

In the following description and in the claims various details will be identified by specific names for convenience, but the names are intended to be as a generic in their application as the art will permit.

Referring to the drawings, a transmission housing 20 in Figs. 1, 2, 3 and 4 consists of a bottom part 21, a center part 22, a top part 23, the parts being aligned by dowel pins 24 and held together by bolts 25.

An input shaft 26 is mounted in the housing in bearings 27 and 28, one end of the input shaft being shown as equipped with a key 29 and lock nut 30 to receive a gear, pulley, coupling or other means for connection to a prime mover.

The rotary motion of the input shaft 26 is translated into reciprocating motion of suitable reciprocable members which travel on a straight path. In the illustrated embodiment said members are a pair of reciprocable plungers 31 and 32 mounted in the housing 20 for reciprocating straight line movement in guide bearings 33, 34, 35 and 36, closed by covers 46 having plugs 45.

In order to obtain a dashpot action at the ends of the stroke of the reciprocable plungers 31 and 32, said plungers are provided with cylindrical end portions 37, 38, 39 and 40 fitting snugly into the respective guide bearings 33, 34, 35 and 36, and forming a cylinder and piston arrangement therewith. The length of the portion of the stroke during which the dashpots are active is determined by the length of air vent passages 41, 42, 43 and 44 in the cylindrical wall of the guide bearings 33, 34, 35 and 36. In case no dashpot action is desired, the vent passages 41—44 may be extended the full length of their respective guide bearings.

The reciprocable plungers 31 and 32 are driven from the input shaft 26 by two cam means which may be substantially identical, each cam means having a power cam surface and a return cam surface. The cam surfaces are engaged by roll members mounted on the reciprocable plungers 31 and 32, at all rotary positions of the cam to insure a positive control of the movement of the plungers 31 and 32. The shape of the cam surfaces is preferably such that the reciprocable plungers 31 and 32 are moved in a power stroke in one direction during more than 180° of rotation of the input shaft 26 and returned in a return stroke in the opposite direction during less than 180° of input shaft rotation. Thus two power strokes of more than 180° are available during each revolution of the input shaft 26. The cam means are so arranged as to have a phase relation of approximately 180° with respect to each other resulting in an overlapping of the power strokes and insuring a smooth continuous transmission of power onto the reciprocable plungers 31 and 32.

In the illustrated embodiment two sets of plate cams are provided, one set for each plunger 31 and 32. The first set comprising cams 47 and 48 is splined to the input shaft 26 and associated with the plunger 31. The second set of cams comprises cams 49 and 50 likewise splined to the input shaft 26 and is associated with the reciprocable plunger 32. A counter-balance 122 is also splined on input shaft 26.

Means for engaging the surfaces of cams 47, 48, 49 and 50 are provided which have the form of rollers 51, 52, 53 and 54, one for each cam. The rollers 51, 52, 53 and 54 are mounted near the longitudinal axis of the plungers 31 and 32 to insure a favorable transmission of power without undue side thrust or lateral deflection of the plungers 31 and 32, said roller being mounted on pins 55, 56, 57 and 58. For the same reason the axis of the input shaft 26 and the center of the cams 47, 48, 49 and 50 and pins 55—58 and also pins 100 and 101 (referred to below) are all located in the same plane as the longitudinal axis of the plungers 31 and 32.

Elongated transverse apertures 59 and 60 are provided in plungers 31 and 32 to permit the input shaft 26 to pass therethrough and further elongated apertures 61 and 62 at right angles to the first apertures for accommodating the cams 47, 48, 49 and 50.

Referring now to Figures 1, 4, 9 and 10, two pairs of stabilizing rollers 63 are mounted on shaft 64. Said shaft 64 is secured in top part 23 of housing 20. One pair of rollers 63 engages flat surface 115 of plunger 31 and the other pair engages flat surface 114 of plunger 32. Said engagement of rollers 63 with flat surfaces 114 and 115 is to counteract any slight tendency for the plungers 31 and 32 to rotate in their guide bearings 33, 34, 35, 36 due to the fact that the central planes of the follower rollers 51, 52, 53 and 54 are located slightly off the central axes of the plungers 31, 32.

The cams in each set are so shaped and arranged with respect to each other as to engage their respective follower rollers positively at all rotary positions, as will be described further below in connection with the cam diagram Figure 11.

Referring now to Figures 1, 3, 4, 9 and 10, a second pair of reciprocable slides 65 and 66 is provided to receive an amplified or reduced motion from the first pair of reciprocable plungers 31 and 32 for retranslation into rotary motion of the output shaft 26 through suitable power transmitting devices.

Reciprocable slides 65 and 66 are supported for straight line reciprocating movement on rods 67, 68 and 69 and 70 mounted in the housing. The reciprocable slides are provided with racks 71 and 72 driving pinions 73 and 74 respectively. The pinions 73 and 74 in turn are connected to roller-drives 75 and 76 that drive an output shaft 77. The output shaft 77 may be provided with a key 78 and lock nut 79 for connection to a coupling, gear, pulley or other part to be driven.

The two roller drives 75, 76 are combined into a unitary assembly for simplicity and compactness, the same groups of wedging surfaces 88, 89 on shaft 77 being used for both drives. The roller-drives 75 and 76 are shown in greater detail in Figures 5 to 8 and comprise housings 80 connected to or integral with the respective pinion 74 or 73. Rolls 81 spaced by a cage 82 are urged in clockwise direction (Figure 8) by helical springs 83 and contact balls 84. The cage 82 is secured to the output shaft 77 by a screw 85 having a cylindrical extension 86 inserted in a corresponding bore 87 of the shaft 77.

The shaft 77 is provided with wedging surfaces 88 and 89, the surface 89 being effective in the device assembled as shown in Figure 8. Surface 89 forms a wedge-like space with the inner cylindrical wall 116 of the housings 80 into which the rolls 81 move and become wedged on clockwise rotation of the housing 80, carrying the shaft 77 with it. If the power applied to the housing 80 through the pinion 74 ceases at the end of a power stroke, the shaft 77 will continue in said clockwise rotation thus freeing the rolls 81 from their wedged position, while the housings 80 may freely be moved in a counter-clockwise direction with respect to the shaft 77. Springs 83 and contact balls 84 are so arranged that they hold rolls 81 in their working positions at all times. Thus the slightest differential in movement between housings 80 and shaft 77 will cause rolls 81 to instantaneously wedge or release as the case may be.

The illustrated form of roller-drive may be adapted for driving in the opposite direction by reassembly. For this purpose the cage 82 is removed and reinserted after inverting it so that the springs 83 urge the rollers 81 in counter-clockwise direction. In the latter assembly, the rollers 81 rest on the surfaces 88, the wedge-shaped space becoming narrower in counter-clockwise direction.

Referring to Figures 1, 2, 3, 4, 9 and 10, two working beams 90 and 91 are pivotally connected to the reciprocable slide members 65 and 66 by pins 92 and 93 and anti-friction bearings 94 and 95. The other end of the working beams is forked as at 96 and 97 to engage the reciprocable plungers 31 and 32 through anti-friction bearings 98 and 99 on pins 100 and 101.

Intermediate their ends the working beams 90 and 91 are mounted for pivotal movement on a common axis, the position of the pivotal axis being adjustable so as to permit of increase of one lever arm and a corresponding decrease of the other lever arm.

For this purpose a single crosshead 102 is slidably mounted on a guideway formed of rods 103 and 104. The crosshead 102 is adjustable along the guideway by a screw 105 engaging the crosshead 102, the screw 105 being operable by a hand crank 106 as shown, or any suitable mechanical control means. The screw 105 is held from longitudinal movement by a suitable radial thrust bearing 120 in the cover 121 of the housing 20. The crosshead further comprises jaws 107 and 108 mounted on anti-friction bearings 109 and 110 pivoted on a common fulcrum pin 111. The jaws 107 and 108 slidably engage the working beams 90 and 91, adjustable gibs 112 and 113 being suitably provided to eliminate play.

It will be understood that the lines of movement of the plungers 31 and 32 are parallel to each other and to the lines of movement of slides 65 and 66. The axes of plunger pins 100, 101 are equi-distant from the axis of fulcrum pin 111 at any position of the adjustable crosshead 102. Similarly, the axis of slide pin 92 on the driven end of working beam 90 is located at the same distance from the fulcrum pin 111 as the slide pin 93 on working beam 91 at any position of the crosshead 102.

The operation of the transmission is as follows:

Uniform constant speed rotary motion applied to input shaft 26 causes rotation of cam sets 47, 48 and 49, 50 which in turn reciprocate their respective plungers 31, 32. The reciprocating motion of plunger 31 is transmitted to slide 66 through working beam 90. Similarly, the reciprocating motion of plunger 32 is transmitted to slide 65 through working beam 91. If the lever arms of the working beams 90, 91 are equal, that is, if the pivot pin 111 of the crosshead 102 is exactly midway between plunger pins 100, 101 and slide pins 92, 93, the speed and stroke of the slide members are equal to that of the plunger members. If the crosshead 102 be moved toward the plungers 31 and 32, the speed of the slides 65, 66 is increased. Similarly, if the crosshead 102 be moved toward the slides 65, 66, their speed is decreased and becomes zero when the pin 111 of the crosshead 102 is in alignment with pivot pins 92, 93 connecting the working beams 90, 91 with the slides 65, 66. No movement is imparted to output shaft 77 in this position.

During each power stroke a pinion 73 or 74 meshing with its rack 71 or 72 mounted on the slides 65 and 66 causes its unidirectional roller-drive or overrunning clutch 75 or 76 to engage the output shaft 77. Since the cams 47, 48, 49 and 50 are so shaped as to drive plungers 31 and 32 in one direction during more than 180° of input shaft 26 rotation, and since the two sets of cams 47, 48, 49 and 50 have a phase relation of approximately 180°, the power stroke of one plunger 31 or 32 commences before the power stroke of the second plunger 31 or 32 ends. This overlapping of the power strokes insures (at all positions of adjustment of crosshead 102, and when constant angular velocity is applied to the input shaft 26) a continuous smooth flow of power from the output shaft 77.

The cams 47, 48, 49 and 50 are so shaped as to move the plungers 31 and 32 equal increments for each degree of cam rotation during the major portion of the power strokes during which power is transmitted to the output shaft 77 through the working beams 90 and 91 and the roller-drives 75 and 76. During this portion of the power stroke the power cams impart constant and uniform velocity to the plungers 31 and 32. During this period each plunger 31 and 32 causes its corresponding slide 65 or 66 to move at a velocity which is also constant and uniform, due to the fact that for all positions of the crosshead 102 the strokes of the slides 65 and 66 are proportional to the strokes of the plungers 31 and 32. Uniform rotary motion of the input shaft 26 is thus converted into uniform rotary motion, of the same magnitude or of a different magnitude, of the output shaft 77.

A preferred layout of the cams 47, 48, 49 and 50 is shown in Figure 11 showing a pair of cams I and II splined on an input shaft A. A follower roller B is in contact with the surface of cam I and a similar roller C is provided for cam II. The rollers B and C are mounted with their centers at a fixed distance on a plunger (not shown) which reciprocates along axis D passing through the centers of the rollers B and C and shaft A.

The two cams I and II are of identical shape. Cam I is mounted in position on shaft A as indicated in Figure 11. The position for mounting of cam II is obtained by holding cam II in the position as shown for cam I, then by inversion of cam II about the axis D and subsequent rotation of the inverted cam II in a counterclockwise direction of 60°.

In the illustrated position roller B contacts the low portion of cam I, while roller C contacts the high portion of cam II. Assuming clockwise rotation of the input shaft A, cam I is the power cam and cam II is the return cam. The rotary angles of cam I are found in circle 1, the starting point being on the axis D to the right of A. The corresponding angles of cam II are found in circle 2, the starting point being on the axis D to the left of A.

During the first 20° of rotation, cam I imparts to roller B, and the plunger carrying the rollers B and C a harmonically accelerated motion to the right. Roller C is in contact with the follower cam II which is so shaped as to complement the increase in the radius of cam I by a corresponding decrease of the radius of cam II.

During the next indicated 200° of rotation, the increasing radii of power cam I moves the roller B, and the plunger an equal distance to the right for each degree of rotation while the radii of the return cam II, in contact with roller C, decrease correspondingly.

This 200° rotation of cam I is followed by a harmonically retarded motion for 20° of cam rotation, during which the plunger is decelerated. Five degrees of rest follow the deceleration period, the cam surfaces being arcs of a circle, or dwells, within the five degree range. In this position follower roller B contacts the high portion of the power cam I, whereas roller C contacts the low portion of the return cam II.

At the end of the 5° rest period, the return stroke begins. The increase in the radii of the return cam II from the low point causes the roller C and the plunger to move to the left. During the return period the radii of the power cam I decrease progressively for a total of 110° of rotation followed by another rest period, or dwell, of 5° at the low point of cam I.

Considering now the return cam II, it was hereinbefore explained that during the initial 20° acceleration period of the power cam I, the following 200° uniform motion period and the 20° deceleration period of the power cam I, the radii of the return cam II decrease correspondingly to the increase in the radii of the power cam, permitting the follower roller C to remain in contact with the return cam II. After the rest period, or dwell, of 5° the return stroke begins. The return stroke covers a total of 110° of angular movement. During this 110° of angular movement the increase in the radii of cam II imparts to roller C and the plunger a motion to the left, the first 55° of said motion being a harmonically accelerated motion followed by 55° of harmonically retarded motion. This action is complemented by a corresponding decrease in the radii of cam I. The return stroke is followed by another 5° of rest at the end of which 360° are completed and the cams I and II are in a position to begin another power stroke.

During all positions of the cam roller B is in contact with cam I and roller C is in contact with cam II, insuring positive drive at all times with no lost motion.

Both sets of cams 47, 48 and 49, 50 are identical with the set illustrated in Figure 11. Set 47, 48 is so mounted as to have a phase relation of 180° with respect to set 49, 50. In this arrangement the power stroke of the second set 49 and 50 begins 20° before completion of the power stroke of the first set 47 and 48 and the first set 47 and 48 begins a new power stroke 20° before completion of the power stroke of the second set 49 and 50. The 180° relationship between the two sets of cams 47, 48, 49 and 50 also helps balance the input shaft 26, thus minimizing vibration due to unbalance.

The particular features and advantages of this invention include great simplicity of design leading to rugged construction which makes power transmission devices according to this invention admirably suited for use under strenuous operating conditions, such as in machine tools, farm and industrial tractors, trucks, automobiles and wherever variation in uniform speeds are desired.

With a minimum number of movable parts and without the use of belts, links or rolling friction devices a transmission is obtained which permits of infinite variation of speed ratio between an input and an output shaft from zero speed of the output shaft to maximum speed which may be at or above the speed of input shaft. It also provides a smooth uniform velocity at the output shaft, at all speed ratios with constant velocity applied to the input shaft.

The variation of speed is easily obtained by the adjustment of a single part, the crosshead 102, changing the leverage of both working beams 90 and 91 simultaneously. The symmetrical arrangement of the movable parts further contributes to smooth operation and economy of space.

Referring now to Figs. 12 and 13, this modification illustrates a construction in which a plurality of separately adjustable output shafts 77A and 77B are driven from the same input shaft 26'. Such a construction is convenient in the case of machine tools. In a milling machine, for example, it may be desirable to vary the speed of the cutter and to vary independently the feed of the work in relation to the cutter.

In Figs. 12 and 13 parts corresponding to similar parts in Figs. 1 and 2 will be indicated by similar reference characters. The reference characters denoting parts associated with the common input shaft are primed and the reference characters indicating parts corresponding to the several output shafts are followed by the letters A and B, to distinguish them from Figures 1 and 2.

Since the details of construction of the modification shown in Figs. 12 and 13 are similar to the details of Figs. 1 and 2, only main operating parts of the modified form will be described. The single input shaft is denoted by 26' and the two output shafts by 77A and 77B. The input shaft 26' carries sets of cams 47', 48' and 49', 50' operating double ended plungers 31' and 32'. Each plunger operates two working beams 90A, 90B and 91A, 91B. The working beams are fulcrumed on crossheads 102A and 102B adjustable by hand cranks 106A and 106B to vary the speed of the output shafts 77A, 77B independently of each other.

The working beams 90A, 91A operate driven sides 65A, 66A and working beams 90B, 91B operate driven slides 65B, 66B. The driven slides 65A, 66A drive output shaft 77A through roller-drives and driven slides 65B, 66B drive output shaft 77B through roller-drives.

The operation of the form shown in Figs. 12 and 13 will be obvious from the explanation given in connection with the form shown in Figs. 1 to 11. Assuming that the transmission is used on a milling machine, the milling machine motor or line drive shaft will be connected to input shaft 26'. One of the output shafts 77A, for example, will be connected to the milling machine rotary cutter and the other output shaft 77B will be connected to the mechanism for feeding the work to the cutter. Thus the speed of output shaft 77A will be controlled by turning hand crank 106A and the speed of output shaft 77B will be controlled independently of output shaft 77A, by turning the hand crank 106B.

Obviously, the present invention is not limited to the particular embodiment herein shown and described. Various substitutions and modifications may be made without departing from the scope, spirit and teaching of this invention.

What is claimed is:

1. In a mechanical transmission, an input shaft; two sets of cams on said shaft, each set comprising two substantially identical cams, one being a power cam and the other being a return cam, the two sets of cams being so mounted on said input shaft as to have a phase relation of approximately 180° with respect to each other; a pair of first members mounted for reciprocating movement at right angles to said shaft, each member having a first elongated transverse aperture through which said shaft extends and a second elongated aperture at right angles to said first aperture to accommodate a set of cams; follower rollers on said members to either side of said shaft, there being a roller for each cam; an output shaft spaced from and parallel to said input shaft; a pair of second members mounted for reciprocating movement parallel to said first members; overrunning clutches operatively connecting said second members and said output shaft to drive the latter; a pair of working beams, each beam connecting a first and a second member; a single ratio-adjusting guideway at right angles to said shafts and to the direction of travel of said first and second members; a single cross-head on said guideway; means for adjusting the position of said cross-head along said guideway; and a pair of fulcrum members independently and coaxially fulcrumed on opposite sides of said cross-head, said fulcrum members slidably engaging said working beams.

2. In a transmission having an input shaft and a plurality of output shafts, adjustable ratio controlling members for independently controlling the speed of said output shafts, a cam device driven by said input shaft, a reciprocating drive member driven by the said cam device, a plurality of working beams driven by said reciprocating drive member, a plurality of reciprocating driven members driven respectively by said working beams, power transmitting devices between said driven reciprocating members and said output shafts respectively, and means governed by said adjustable ratio controlling members for adjusting at least one lever arm of each working beam by its corresponding ratio controlling member to vary the speed ratio of the corresponding output shaft with respect to said input shaft.

3. In a mechanical transmission, a single input shaft, two output shafts, said input shaft having two sets of cams, each set comprising a power cam and a return cam, a single pair of plunger members driven by said two sets of cams respectively, each said plunger member comprising a central yoke portion straddling said input shaft and cylindrical end portions, aligned cylindrical guideways for said end portions, two pairs of output slides, one pair for each output shaft, guideways parallel to said plunger guideways for said output slides, corresponding slides of the two pairs being located in line, two pairs of working beams, each pair being driven by said single pair of plunger members and driving respectively a pair of output slides, said plunger members having pivot devices at either side of said cams connecting said working beams, two crossheads each crosshead acting as a fulcrum for its corresponding pair of working beams, means for independently adjusting the position of said crossheads, a pair of overrunning clutches on each output shaft, pinions connected to said overrunning clutches, racks connected to said output slides and meshing said pinions.

4. In a mechanical transmission, a single input shaft, a plurality of output shafts, said input shaft having two sets of cams, each set comprising a power cam and a return cam, a single pair of carrier members driven by said two sets of cams respectively, guideways for said carrier members, a plurality of pairs of output slides, one pair for each output shaft, guideways parallel to said carrier guideways for said output slides, a plurality of pairs of working beams, each pair being driven by said single pair of carrier members and driving respectively a pair of output slides, said carrier members having pivot devices connecting said working beams, a plurality of crossheads, each crosshead acting as a fulcrum for its corresponding pair of working beams, means for independently adjusting the position of said crossheads, a pair of overrunning clutches on each output shaft, pinions connected to said overrunning clutches, racks connected to said output slides and meshing said pinions.

5. In a transmission, an input shaft having two sets of cams, each set comprising a power cam and a return cam, two driving and two driven carriers, straight line paths on which said carriers are mounted to reciprocate, each driving carrier having a power roll and a return roll engaging their respective power and return cams and mounted on their carriers at opposite points in such manner that said cams exert positive and continuous driving force on said carrier during both forward and return strokes, two working beams, each beam connected to a set of driving and driven carriers, fulcrums for the respective working beams, a single cross-head between said working beams and supporting said fulcrums in cantilever fashion, a guideway on which said cross-head is adjustable to change the speed ratio of said driving and driven carriers, an output shaft, power transmitting devices between said driven carriers and said output shaft, said cams having portions of such rise as to impart constant velocity to said driving carriers and other portions of such rise as to accelerate and decelerate said driving carriers at the ends of their strokes with constant angular velocity imparted to said input shaft, the constant velocity applied to each driving carrier corresponding to at least 180° of cam rotation and complementing the constant velocity applied to the other driving carrier, whereby said output shaft partakes of substantially uniform angular velocity at all speed ratios with uniform angular velocity applied to said input shaft.

6. In a transmission, an input shaft having two sets of cams, each set comprising a power cam and a return cam, two driving and two driven carriers, straight line paths on which said carriers are mounted to reciprocate, each driving carrier having a power roll and a return roll engaging its respective power and return cams, said rolls being mounted on their carriers at opposite sides of said shaft in such manner that said cams exert positive and continuous driving force on said carriers during both forward and return strokes, two working beams, each beam being connected to a set of driving and driven carriers, fulcrum means for said working beams providing lever arms, an output shaft, power transmission devices between said driven carriers and said output shaft, said cams having portions of such rise as to impart constant velocity to said driving carriers at times and other portions of such rise as to accelerate and decelerate said driving carriers at the ends of their strokes with constant angular velocity imparted to said input shaft, the constant velocity applied to each driving carrier corresponding to at least 180° of cam rotation and complementing the constant velocity applied to the other driving carrier, whereby said output shaft partakes of uniform angular velocity at all speed ratios with uniform angular velocity applied to said input shaft, and means for adjusting the length of at least one of the lever arms of said working beams to vary the speed ratio of said transmission.

7. In a transmission, an input shaft having two sets of cams, each set comprising a power cam and a return cam, two driving and two driven carriers, straight line paths on which said carriers are mounted to reciprocate, each driving carrier having a power roll and a return roll engaging its respective power and return cams, said rolls being mounted on their carriers at opposite sides of said shaft in such manner that said cams exert positive and continuous driving force on said carriers during both forward and return strokes, two working beams, each beam being connected to a set of driving and driven carriers, a guideway, an adjustable cross head slidably mounted on said guideway, fulcrum means on said cross head for said working beams, an output shaft, power transmission devices between said driven carriers and said output shaft, said cams having portions of such rise as to impart constant velocity to said driving carriers at times and other portions of such rise as to accelerate and decelerate said driving carriers at the ends of their strokes with constant angular velocity imparted to said input shaft, the constant velocity applied to each driving carrier corresponding to at least 180° of cam rotation and complementing the constant velocity applied to the other driving carrier, whereby said output shaft partakes of uniform angular velocity at all speed ratios with uniform angular velocity applied to said input shaft.

GOTHARD THEODORE MOO.

REFERENCES CITED

The following references are of record in the file of this patent:

UNITED STATES PATENTS

| Number | Name | Date |
|---|---|---|
| 260,509 | Von Zach | July 4, 1882 |
| 874,931 | Brenner | Dec. 31, 1907 |
| 950,317 | Doherty | Feb. 22, 1910 |
| 982,666 | Girin | Jan. 24, 1911 |
| 1,648,780 | Nuesell | Nov. 8, 1927 |
| 1,806,526 | Eckersley | May 19, 1931 |
| 1,938,785 | Sassen | Dec. 12, 1933 |
| 2,014,476 | Johnson | Sept. 17, 1935 |
| 2,159,739 | Johnson | May 23, 1939 |
| 2,316,793 | Johnson | Apr. 20, 1943 |

FOREIGN PATENTS

| Number | Country | Date |
|---|---|---|
| 249,888 | Great Britain | Mar. 17, 1927 |
| 446,585 | Germany | July 5, 1927 |
| 659,955 | France | Feb. 11, 1929 |

OTHER REFERENCES

Cams Elementary and Advanced, Furman (1921). Pages 65–68 inclusive and pages 138–141 inclusive.